United States Patent [19]

Arditty et al.

[11] 4,191,446
[45] Mar. 4, 1980

[54] DIRECTIONAL COUPLING-DEVICE FOR MULTI-MODE OPTICAL FIBRES

[75] Inventors: Hervé Arditty, Marly-le Roi; Jean-Jacques Hunzinger, Paris, both of France

[73] Assignee: U.S. Philips Corporation, New York, N.Y. 10017

[21] Appl. No.: 640,706

[22] Filed: Dec. 15, 1975

[30] Foreign Application Priority Data

Dec. 16, 1974 [FR] France ................. 74 41330

[51] Int. Cl.² ................................ G02B 5/14
[52] U.S. Cl. ................... 350/96.15; 250/227; 350/96.16
[58] Field of Search ............ 350/96 C, 96 WG, 96.15, 350/96.16; 250/227, 551–553, 199

[56] References Cited

U.S. PATENT DOCUMENTS

| | | | |
|---|---|---|---|
| 3,864,019 | 2/1975 | Smolinsky et al. | 350/96 C X |
| 3,874,779 | 4/1975 | Thiel | 350/96 C X |
| 3,937,560 | 2/1976 | Milton | 350/96 C |
| 3,944,328 | 3/1976 | Kent et al. | 350/96 C |
| 4,021,099 | 5/1977 | Kawasaki et al. | 350/96 C |

OTHER PUBLICATIONS

Copper, Article in *IBM Technical Disclosure Bulletin* Oct. 1973, pp. 1470 and 1471.
*Electronics* Dec. 20, 1973 p. 30.
Lynch, Article in *IBM Technical Disclosure Bulletin* Jul. 1970, pp. 533 and 534.

*Primary Examiner*—Stewart J. Levy
*Attorney, Agent, or Firm*—Marc D. Schechter

[57] ABSTRACT

A directional coupling device for single multi-mode optical fibers which are disposed coaxially in a transparent body of the coupling device, a suitable space filled with an immersion medium being formed between the end faces of the two fibers; means for introducing light rays and photo-sensitive means for picking up the dispersion flux are respectively arranged on at least one of the ends of the body of the coupling device.

13 Claims, 9 Drawing Figures

DIRECTIONAL COUPLING-DEVICE FOR MULTI-MODE OPTICAL FIBRES

BACKGROUND OF THE INVENTION

The invention relates to a directional coupling device for multi-mode optical fibers, which comprises a coupler body made of a material which is transparent in the wavelength range of optical radiation and which is used as a carrier for the transmitted information, and which body is destined to co-operate with the ends of two optical fibers, at least one of these fibers transferring the information from one or more information sources which are disposed along the information routing circuit to which said optical fibers belong, and at least one of said fibers transferring the information conveyed by the other fiber, to which the latter information specific information is added which is introduced in the directional coupling device.

Coupling devices of the type are known, for example from an article published in the American magazine "Electronics" of Dec. 20, 1973, (page 30), entitled: "Simple coupler taps fiber optic cables".

The optical coupler described in this article is made by diagonally cutting a small parallelepiped-shaped block of glass, polishing the two surfaces which correspond to the plane of cutting,. silvering one of the surfaces thus prepared while leaving a transparent pupil in the center of said surface, and subsequently reassembling the block.

If the light coming from a bundle of optical fibers is concentrated at one of the ends of the coupler, a small fraction of the light beam is reflected by the silvered surface and propagates perpendicularly to the axis of the coupler towards one of the sides of the block, where it can be detected by a photodiode. Most of the light, however, continues through the coupler towards the other end, where a fraction of the light re-enters the bundle of fibers which terminates at said other end. For introducing information, a light-emitting diode emits radiation perpendicularly to that side of the block, which is opposite to said side, in the direction of the other face of the silvered area.

The coupling device whose structure and principle of operation are described in the cited article, is used in co-operation with cables consisting of a bundle of multi-mode fibers and is consequently not suitable for use with single multi-mode fibers at the input and at the output of the coupling device.

The manufacture of such a coupler is difficult and complicated. If it would be necessary to reduce the dimensions of the coupler in order to adapt it for operation with a multi-mode fiber at the input of the coupler and a multi-mode fiber at the output of the coupler, the manufacturing problems would become substantially insurmountable. The necessity of extremely accurate arrangement and fixation of the optical fibers relative to the pupil of the mirror, which is integrated in the tiny parallelepiped block of the coupling body, would present difficult problems to the user.

Furthermore, the insertion losses introduced by the coupler described are substantial (4.5 dB at the moment that the article was written, with the expectation that this could be reduced to 3 dB), while both the degree of coupling between the bundle of optical fibers and the percentage of luminous flux needed to enable information to be extracted are not adjustable.

SUMMARY OF THE INVENTION

It is one of the objects of the invention to mitigate these drawbacks, and to enable directional coupling devices for multi-mode optical fibers to be realized which can be manufactured easily and of which the inherent insertion losses are very low.

Another object of the invention is to enable directional coupling devices to be realized of which the degree of coupling between the optical fibers is adjustable and which at the same time allow the percentage of light extracted from the flux which is passed through one of the fibers to be adjusted. From this extracted flux the information is derived, which is preferably extracted at the coupling device.

The invention makes use of the fact that the realization of an adjustable coupling between the optical fibers which are used and of an optimum "regeneration" of the dispersion luminous flux, which results from a coupling factor smaller than unity, enable directional couples to be manufactured with better characteristics than those of the couplers known to date.

According to the invention the coupled optical fibres are disposed in line in the body of the directional coupler, the ends of the two optical fibres fixed opposite each other at an adjustable distance which corresponds to the desired degree of coupling between the two optical fibres, means for introducing light rays into the body of the directional coupler and into at least one of the optical fibers which includes a radiation source, being arranged on at least one of the ends of the coupler body, and photo-sensitive means for picking up at least a fraction of the dispersion luminous flux extracted from the luminous flux which is passed through at least one of the two fibers, and which means comprises at least one photosensitive detector, being arranged on at least one of the ends of the body of the coupling device.

One of the major technical advantages of the directional couplers according to the invention is that they do not cause any substantial losses of the luminous flux for the transfer of information from a first optical fiber towards a second optical fiber, and that the luminous flux taken from the coupler according to the invention is only slightly higher than the luminous flux which is to be taken from the fibers for extracting the information transmitted over the circuit to which the optical fibers belong which terminate at the relevant directional coupler.

Another advantage of the directional coupler according to the invention is that owing to the arrangements used it is possible during assembly to adjust the magnitude of the fraction of the luminous flux to be extracted, as a function of the value of the luminous flux conveyed by the relevant optical fiber, i.e. the input fiber of the relevant coupler in a very easy manner, the magnitude of said fraction being dependent on the distance between the end faces of the fibers in the body of the coupling device.

Another advantage of the directional coupling devices according to the invention is that they are "self-connecting" and that for connecting them to the optical fibers which are used, it is not necessary to employ two auxiliary connectors which would have to be disposed at either side of the relevant coupler, but that it simply suffices to insert the ends of said optical fibers into the body of the coupler.

A further advantage of the directional couplers according to the invention is that said couplers are components of small dimensions (for example with a length of the order of 10 mm), without being microscopically small components, i.e. they form components which can for example be handled and mounted very easily.

In an advantageous embodiment of the invention, the body of the directional coupling device is constructed starting from a length of thick-walled tube whose inner diameter is slightly greater than the diameter of the two optical fibers used (capillary tube). The use of a capillary tube as a starting material allows the precision required for in-line mounting of the optical fibres with which the coupler co-operates to be obtained in economic fashion.

In accordance with a suitable modification of the invention, the ends of the optical fibers are immersed in a transparent body, which is at least temporarily fluid, whose index of refraction is at least equal to that of the outer zone (sleeve) of the optical fibers which are used. Such an arrangement contributes to the stability of the curve which represents the variation of the coefficient of coupling between the optical fibers as a function of the distance (for example expressed by taking the diameter of the core of the fibers as a unit) which separates the end faces of the two fibers. This facilitates adjustment of the magnitude of the fraction of the luminous flux extracted from the flux which is passed through at least one of these fibers, and which fraction is used as a dispersion luminous flux, and the value of said fraction subsequently remains very stable. In accordance with a suitable embodiment of the invention, the immersion medium is constituted by a silicone oil and after adjustment of their positions in the coupler body the optical fibers are immobilized by a drop of glue which is applied to the points where the optical fibers are inserted in the coupler body.

In accordance with a different modification of the invention, the transparent body, which is used as immersion medium is a synthetic resin, for example a resin of the family of epoxy resins, to which a curing catalyst is added just before use. It then suffices to keep the two optical fibers temporarily in the correct position after adjustment of the distance between their end faces. Spontaneous curing in cold condition of the resin which is used under the influence of the curing catalyst assures that the optical fibers are immobilized in the coupler body.

In accordance with one of the embodiments of the invention, of which the coupler body is made starting from a length of thick-walled tube (capillary tube), the end faces of the length of capillary tube which constitutes the coupler body are substantially perpendicular to the axis of said tube and they each carry at least one radiation-sensitive element. This embodiment leads to a coupler structure of maximum simplicity. In this respect a radiation-sensitive element is to be understood to mean both a radiation source and a radiation-sensitive detector.

In a further embodiment of the invention at least one of the ends of the body of the coupling device is at least partially constituted by an oblique plane reflecting surface, which makes an angle of approx. 45° with the axis of the optical fibers. Also, there is in that at least one plane surface which is parallel to the axis of the optical fibers, and this surface carrier at least one radiation-sensitive element which is at least partially disposed in the wall of the body of the directional coupler, straight above the oblique plane reflecting surface. This embodiment, which by itself does not concentrate the luminous flux, is favorable for use with radiation-sensitive elements whose active surface is comparatively large, and can be used easily. It provides very stable input and output conditions for the light rays which must enter or leave the coupler body.

In accordance with one of the characteristic featuress of the invention, the radiation-sensitive elements which are used are coupled to input and output zones of light rays, in and outside the body of the directional coupling device respectively, via an optical means for concentrating the luminous flux. This means is particularly important in the case that an oblique plane reflecting surface and a plane entrance (or exit) surface for the light rays is used.

In accordance with a special embodiment of the invention, the optical means for concentrating the luminous flux is constituted by a drop of a transparent synthetic resin, which is molded onto the radiation-sensitive element and onto the coupler body, and which is externally coated with a reflecting metal film. This embodiment has the advantage that fixation and coating of the relevant radiation-sensitive element is assured, while at the same time it is possible to obtain a means for concentrating the flux, with characteristics which comply with the requirements of the invention, in an economic manner.

The invention will be described in more detail with reference to the accompanying drawings.

BRIEF DESCRIPTION OF THE INVENTION

Figure 3:
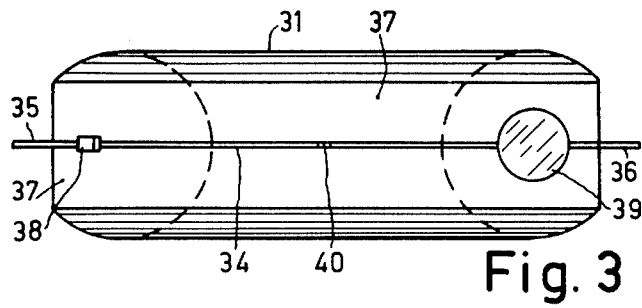
Figure 4:
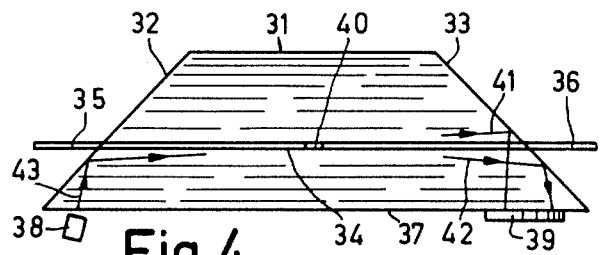

FIG. 3 and FIG. 4 respectively show a bottom view and a top view of a different embodiment of the directional coupling device according to the invention.

Figure 5:
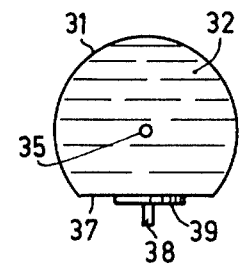

FIG. 5 is a side view of the device shown in FIG. 4.

Figure 6:
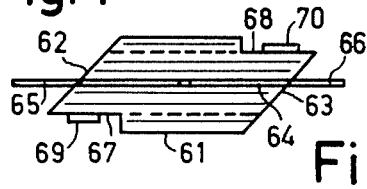

FIG. 6 is a plan view of a directional coupling device according to the invention, which is a modification of the device shown in FIG. 4.

Figure 7:
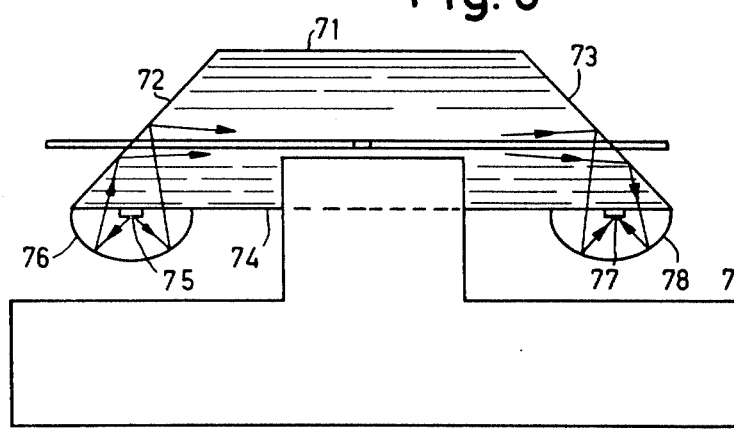

FIG. 7 is a plan view of another modification of the device shown in FIG. 4.

Figure 1:
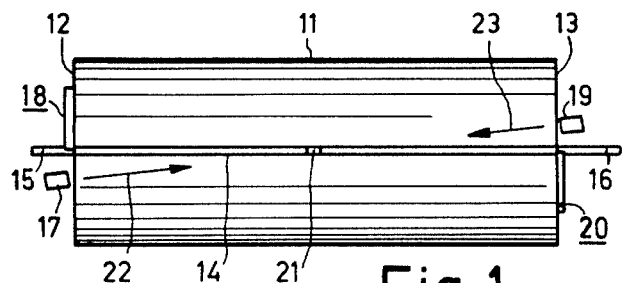
FIG. 1 is a plan view of an example of the directional coupling device according to the invention, which at each of its ends comprises a radiation source and a photo-sensitive detector.
Figure 8:
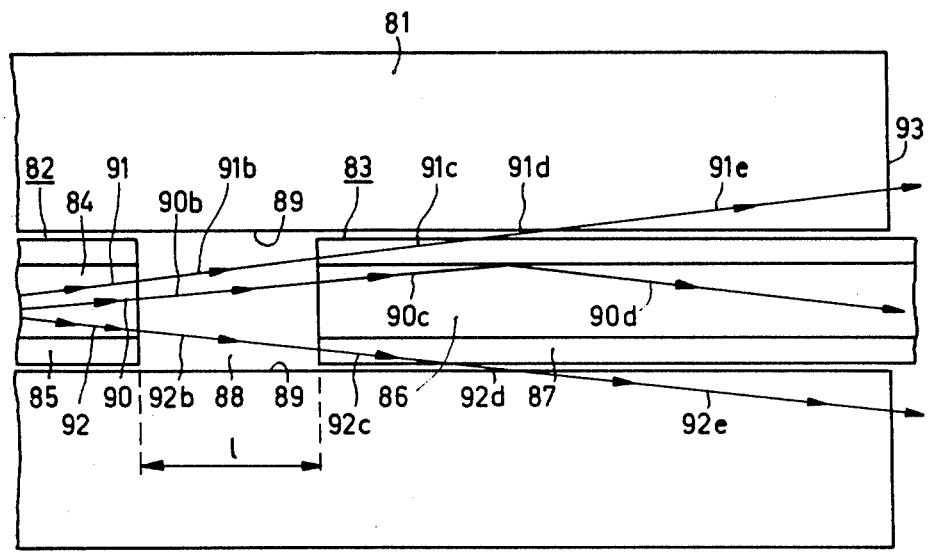

FIG. 8 is a large-scale diagram of the path of the light rays in a directional coupling device as shown in FIG. 1.

Figure 9:
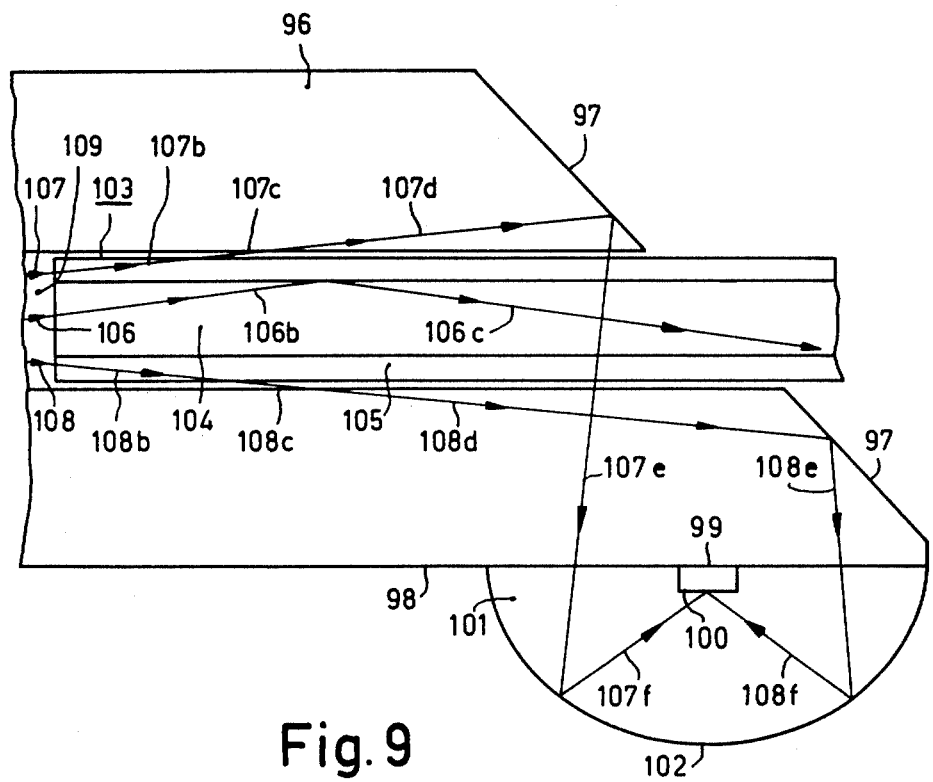

FIG. 9 is a large-scale diagram of the path of the light rays in directional coupling devices as shown in FIG. 4 and FIG. 7.

DESCRIPTION OF THE PREFERRED EMBODIMENTS

Figure 2:
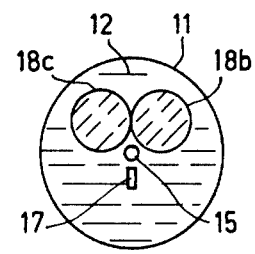
FIG. 2 is a side view of the device shown in FIG. 1.

The directional coupling device which is schematically shown in FIG. 1 and 2 comprises a coupler body 11 which is constituted by a length of thick-walled tube of a transparent material (capillary tube) whose end faces 12 and 13 are plane and substantially perpendicular to the axis of the capillary tube. The faces 12 and 13 are preferably ground and polished after the tube, which is used for the coupler body 11, has been cut to length. Owing to the manner in which it is manufactured, the capillary tube comprises a central duct 14 of very small diameter and of substantially circular cross-section, in which the ends of the two optical fibers 15 and 16 are disposed. Known multi-mode optical fibers are used whose diameter is approximately 100 $\mu$m and which comprise a central portion (the core). The core is surrounded by a sleeve of a material whose index of refraction is slightly lower than that of the core.

A radiation source 17 is disposed in the immediate proximity of the left-hand end face 12 and a photo-sensitive detector 18 is fixed to this end face 12; in a similar way a radiation source 19 is disposed in the immediate proximity of the right-hand end face 13 and a photo-sensitive detector 20 is fixed to said end face 13.

The diameter of the central duct 14 is slightly greater than the diameter of the optical fibers 15 and 16, and a very small amount of a fluid transparent synthetic resin, for example a resin belonging to the family of epoxy resins, to which a curing catalyst has been added, is introduced into the duct 14. During assembly the ends of the optical fibers 15 and 16 are immersed in the resins, at the instant at which the position of the optical fibers 15 and 16 in the coupler body 11 is adjusted, and between the end faces of said optical fibers a distance is left which distance, as a function of the magnitude of the dispersion luminous flux which is required, lies generally between one and five times the diameter of the fiber; the corresponding space, designated by the reference numeral 21, is of course filled with the transparent synthetic resin.

The radiation sources 17 and 19 which are used in the present embodiment are constituted by light-emitting semiconductor diodes, which can function as a "laser", i.e. which are capable of emitting substantially monochromatic coherent light. A feature of radiation sources of this type is furthermore that they emit a very slightly diverging beam of light. Consequently it is not necessary to use such radiation sources in conjunction with an auxiliary means for concentrating the emitted luminous flux. For simplicity the "laser"-effect diodes 17 and 19 are schematically represented in the form of a small wafer of semiconductor material (GaAs for example) which comprises the laser-effect junction, the heat-sink device (which is very large relative to the direction coupler and with which each laser-effect diode is provided for dissipating the heat produced in such diodes during operation, in order to avoid an excessive temperature rise).

The laser-effect diode 17 emits a light beam (visible or infra-red) in the direction of the space 21; this beam is schematically represented by the arrow 22. The angle which the emitted beam makes with the axis of the body 11 is adjusted as a function of the value of the respective refractive index of the material of the coupler body 11, of the transparent synthetic resin used as immersion medium, of the sleeve of the optical fibers, and of the core of said fibres, so as to avoid total reflection, which would prevent the emitted light beam from penetrating the core of the optical fiber 15 or the optical fiber 16. The same considerations apply to the light beam (visible or infra-red) emitted by the laser-effect diode 19 and represented by the arrow 23.

The propagation in the optical fiber 15 of a luminous flux, which in the Figure passes from the left to the right in the direction of the optical fiber 16, gives rise to a dispersion luminous flux, owing to the discontinuity as a result of the presence of the space 21, the value, of said flux relative to the luminous flux which propagates in the fiber 15 being a function of the length of the space 21 and varying in the same sense as the length of said space.

As can be seen in FIG. 8, the corresponding dispersion luminous flux is formed by the oblique rays whose inclination relative to the axes of the optical fibers is rather small; this dispersion luminous flux propagates towards the end face 13 and is partly picked-up by the photo-sensitive detector 20.

The detectors 18 and 20 are identical and in the present example they are each formed by two plane circular photo-diodes, such as the diodes 18b and 18c, shown in FIG. 2. The photo-sensitive surface of each diode is positioned against the end face of the coupler body, which supports each photo-sensitive diode.

The directional coupling device according to the invention shown in FIG. 1 and 2 has been designed for conveying information and for the injection of complementary information in the two possible directions of information transfer, i.e. from left to right and from right to left. For this second direction of information transfer, the luminous flux coming from the right and propagating in the optical fiber 16 gives rise to a dispersion flux, after passing the space 21, which flux is partially picked up by the detector 18. Complementary information can be injected in this second direction of information transfer, by means of the laser-effect diode 19.

The directional coupling device which is schematically shown in FIGS. 3, 4 and 5 is provided with a coupler body 31, which is constituted by a length of a thick-walled tube of a transparent material (capillary tube) whose end faces 32 and 33 are plane and enclose an angle of approximately 45° with the longitudinal axis of the coupler body 31. After machining the faces 32 and 33 are polished for total reflection at said faces of light rays which make a small angle with the longitudinal axis of the coupler body 31, and of light rays which make a small angle with a straight line which is perpendicular to said longitudinal axis. In a modification the faces 32 and 33 may be provided with a reflecting metal coating so that they are converted into mirrors. The capillary tube has an axial duct 34 of very small diameter in which the ends of the two optical fibers 35 and 36 are fitted. At the lower side of the coupling device a plane surface 37 is provided, parallel to the axis of the optical fibers, the photo-sensitive detector 39 being arranged at the right-hand end of said (surface see FIGS. 4 and 5).

A radiation source 38 is mounted in the immediate proximity of the left end of the plane surface 37; this radiation source is a laser-effect diode, shown schematically, as explained in the description relating to the device of FIG. 1.

The detector 39 is preferably a photo-sensitive semiconductor diode.

A space 40 equivalent to the space 21 in FIG. 1, is present between the ends of the optical fibers 35 and 36, and the ends of the fibers 35 and 36 are also immersed in a transparent synthetic resin. Instead of a resin, a fluid silicone oil, may be used as an immersion medium for the ends of the optical fibers, the longitudinal immobilization of the fibers is assured with the aid of a drop of glue (for example cellulose glue), which is applied to the end faces of the fibers after their mutual distance has been adjusted.

A directional coupling device as shown in FIGS. 3, 4 and 5 is specifically destined for a defined direction of information transfer, which information passes from the left through the optical fiber 35 and propagates further towards the right through the fiber 36. The information is extracted at the location of the coupling device with the aid of the photo-sensitive semiconductor diode 39. This diode picks up the light rays, such as 41 and 42, which are representative of the dispersion luminous flux, which flux is derived from the luminous flux which is passed through the optical fiber 35 and which results from the discontinuity constituted by the space 40, after reflection of said light rays at the oblique surface 33.

The introduction of complementary information at the coupling device is effected with the laser-effect diode 38, which emits a light beam in the direction of the arrow 43, which beam is reflected by the surface 32 and is thus returned in the direction of the space 40 and the optical fiber 36 at an appropriate angle.

The example of a modification of a directional coupling device with oblique end faces shown in FIG. 6. is a device which comprises a cylindrical body 61, which terminates in two oblique faces 62 and 63, which are parallel if they enclose the same angle with the axis of the optical fibers 65 and 66 which are disposed in the central duct 64. Two plane faces 67 and 68, parallel to the axis of the optical fibers are respectively provided in the immediate proximity of the left and right ends of the coupler body 61. As a modification, the plane faces 67 and 68 may be plane faces which extend over the whole length of the receiving body in accordance with the patterns represented by dashed lines and which are prolongations of the plane faces 67 and 68.

A radiation source 69 is disposed in the immediate proximity of the face 67 near the left end of the coupler body. A photo-sensitive detector 70 is fixed to the plane face 68 near the right end of the coupler body.

The operation of the device shown in FIG. 6 does not substantially differ from that of the device shown in FIG. 4.

The directional coupling device in accordance with the invention shown in FIG. 7 is largely similar to that shown in FIG. 4, except in respect of the radiation-sensitive elements. The device comprises a coupler body 71 which terminates in two oblique plane faces 72 and 73, which can be metallized to make them reflecting, no matter what the angle of the incident light rays is. At the underside the body 71 is provided with a plane face 74. Two radiation-sensitive elements of small dimensions are respectively fixed near the left and near the right end of the plane face 74, i.e. a radiation source 75 which is constituted by a light-emitting diode of small dimensions whose active surface faces down, and a photo-sensitive detector 77 which is constituted by a photo-sensitive diode of small dimensions whose active surface also faces down. A drop of a transparent synthetic resin 76 is applied to the light-emitting diode 75 and is externally coated with a reflecting metal layer. The profile of the drop of resin 76 is determined as a function of the dimensions of the light-emitting diode 75, so as to ensure focussing of the light rays emitted by the light-emitting diode, after reflection at the metal coating of the drop of resin 76. The light rays which are emitted are reflected for a second time at the plane face 72 before they are focussed onto the axis of the optical fibres, substantially at the location of the spacing formed between the ends of the fibers.

A drop of a transparent synthetic resin 78 is applied to the photosensitive diode 77 and is externally covered by a reflecting metal coating. The profile of the drop of resin 78 is determined, as a function of the degree of divergence of the light rays of the dispersion flux which will be incident on the reflecting metal coating after a first reflection at the plane face 73, so as to ensure focusiing of said light rays at the photo-sensitive diode 77.

The coupler body 71 is supported by a support 79 on which it is for example glued.

FIG. 8 illustrates the method in which the dispersion flux is formed in the directional coupling devices according to the invention, as well as the path of the light rays which constitute this flux in couplers having the structure in accordance with FIG. 1.

In FIG. 8 the central portion of a coupler body 81 and the ends of the two optical fibers 82 and 83 are shown in cross-section (but without hatching in order not to render the Figure illegible). The optical fiber 82 is constituted by a core 84 surrounded by a sleeve 85; the optical fiber 83 is constituted by a core 86 surrounded by a sleeve 87. A spacing 88 of a length 1 is formed between the end faces at the ends of the optical fibers 82 and 83. The space 88, and the small radial space between the optical fibers 82 and 83 and the wall 89 of the central duct of small diameter in which the optical fibers are disposed, are filled with a suitable immersion medium whose index of refraction is at the most equal to the index of refraction of the coupler body 81. Furthermore, the index of refraction of the coupler body and that of the immersion medium are at least equal to the index of refraction of the sleeves of the optical fibres.

In FIG. 8 a light ray 90 is shown which propagates slightly obliquely in the central area of the core 84 of the optical fiber 82 and whose path in this order includes the line segments 90b in the immersion medium which fills the space 88, the line segment 90c in the core 86 of the optical fiber 83 up to the sleeve 87 at which it is totally reflected, and the line segment 90d after this total reflection. Upon successive total reflections this ray travels further in the core of the optical fiber 83.

A light ray, such as the ray 90, forms part of the luminous flux which is transferred from the optical fiber 82 to the optical fiber 83.

FIG. 8 also shows the paths of the two light rays 91 and 92, which propagates in a direction identical to that of the ray 90, in the core 84 of the optical fibre 82, but which approach the exit face of said fiber in an area nearer the sleeve 85, which they approach owing to their angle of propagation. The path of the oblique ascending light ray 91 in this order comprises the line segments 91b in the immersion medium which fills the space 88 (and which causes it to penetrate the sleeve 87 of the optical fiber 83), the line segment 91c in the sleeve 87, the line segment 91d in the immersion medium between the sleeve 87 and the coupler body 81, and subsequently the line segment 91e in the coupler body 81. Similarly, the path of the oblique descending light ray 92 in this order includes the line segment 92b in the immersion medium which fills the space 88 (and which causes the ray to penetrate the sleeve 87 of the optical fiber 83), the line segment 92c in the sleeve 87, the line segment 92d in the immersion medium between the sleeve 87 and the coupler body 81, and subsequently the line segment 92e in the coupler body 81.

The light rays, such as the rays 91 and 92, form part of the dispersion luminous flux resulting from the incomplete transmission to the optical fiber 83 of the luminous flux which is transmitted by the fiber 82. The path as represented in FIG. 8 are purely qualitative, and the angles which the paths make with the axis of the fibers are not very accurate.

The light rays which form the dispersion flux can at least partially be picked up by a photo-sensitive device which is arranged at the exit face 93 of the coupler body 81.

When the mechanism of propagation of the luminous flux in a multi-mode sleeved fiber is taken into account (successive total reflections at the surface separating the core and the sleeve), the light rays which emerge from an arbitrary point of the exit face of the optical fiber 82 are uniformely distributed in a cone whose axis is parallel to the axis of the optical fibres and of which half the apex angle equals the critical angle u for total reflection whose values is $$u = \arccos(1 - \Delta n/n).$$

In this formula n is the index of refraction of the core of the optical fiber and $\Delta n$ the difference between the index of refraction of the sleeve and of the core of the optical fiber.

The fact that in practice the angle u is small allows the calculation of the value of the luminous flux which does not return to the core of the second fiber to be simplified. In a first approximation this flux is given by the simple formula:

$$F = 4\pi/3 \, R \, 1 \, u^3 \, Ln$$

where R is the radius of the core of the optical fibers which are used;

l is the distance between the end faces of the optical fibres, u is the critical angle expressed in radians, Ln is the luminance signal which uniformely saturates the core of the entrance fiber.

Since the flux conveyed by the entrance fiber furthermore has the value $$\phi = \pi^2 \, R^2 \, u^2 \, Ln,$$

the ratio $F/\phi$ of the dispersion flux relative to the total flux conveyed by the entrance fiber consequently equals $$F/\phi = 4/3\pi \, l/R \, u.$$

The exact and thus more precise calculation of the dispersion flux, which does not penetrate the core of the second fiber (exit fiber), involves the use of far more intricate formulas.

In the following table, some values of the dispersion flux are given, calculated with a sufficient accuracy by means of the above formula in the case of optical fibers whose core has an index of refraction of 1.50 and whose sleeve has an index of refraction of 1.49, the length l of the space 88 being expressed by using the diameter of the core of the optical fibers as a conventional length unit.

| l   | 1    | 2     | 3     | 4     | 5   |
|-----|------|-------|-------|-------|-----|
| F/O | 9.8% | 19.6% | 29.4% | 39.2% | 49% |

In respect of the paths of the light rays shown in FIG. 8 it is to be noted that when the length l of the space 88 increases, a substantial percentage of the dispersion flux corresponds to rays which pass directly from the immersion medium filling the space 88 into the coupler body 81.

FIG. 9 shows the straight point of a directional coupler comprising a coupler body which terminates in an oblique reflecting face 97 which encloses an angle of approximately 45° with the axis of the body and which is provided with a plane lower surface 98 on which a photosensitive detector 99 of small dimensions is mounted whose photo-sensitive surface 100 faces down. A drop of a transparent synthetic resin 101 is applied to the detector 99 and is externally provided with a reflecting metal coating 102.

An optical fiber 103, consisting of a core 104 surrounded by a sleeve 105 (whose index of refraction is slightly lower than that of the core) is disposed in the central duct of small diameter of the coupler body. Light rays emerging from a first optical fiber, not shown, traverse the space 109 between the fibers and impinge on the entrance face of the fiber 103. A light ray, such as the ray 106, which penetrates the core 104 of the fibers 103 propagates further in accordance with a first line segment 106b until it is totally reflected at the boundary surface between the core 104 and the sleeve 105, subsequently in accordance with a second line segment 106c, before another total reflection, The light ray 106 propagates further in the core of the optical fiber 103 with successive total reflections.

FIG. 9 also shows the paths of the two light rays 107 and 108, which propagate at angle equal to that of the ray 106, but which penetrate the sleeve 105 of the fiber 103, instead of the core 104. The path of the oblique ascending light ray 107 in this order includes the line segments, 107b in the sleeve 105, the line segment 107c in the immersion medium between the sleeve 105 and the coupler body 96, substantially the line segment 107d in the coupler body 97, the line segment 107e after reflection at the reflecting surface 97, and the line segment 107f after reflection at the reflecting mtal coating 102 which covers the drop of the transparent resin 101 before it hits the active surface 100 of the detector 99. The path of the oblique descending light ray 108 in this order includes the line segment 108b in the sleeve 105, the line segment 108c in the immersion medium between the sleeve 105 and the coupler body 96 the line segment 108d in the coupler body 96, subsequently the line segment 108e after reflection at the reflecting surface 97, and the line segment 108f after reflection at the reflecting metal coating 102, before it hits the active surface 100 of the detector 99.

The light rays, such as the rays 107 and 108, form part of the dispersion luminous flux which results from the incomplete transfer of the luminous flux conveyed by the optical entrance fiber (not shown) to the optical fibre 103.

The dispersion luminous flux may alternatively contain light rays which are passed directly from the immersion medium, which fills the space 109, to the coupler body 96 without penetrating the sleeve 105 of the optical fiber 103.

It can be seen that the arrangement which is schematically shown in FIG. 9 makes it possible to concentrate a substantial portion, if not all, of the luminous flux which has not penetrated the core 104 of the fiber 103 on a detector of small dimensions, and which constitutes the dispersion flux at the space formed between the ends of the optical fibers which are used.

An important consequence of the appearance of a dispersion luminous flux at the location of a space between the end faces of the two optical fibers (such as the space 88 between the optical fibers 82 and 83 in FIG. 8). and the desaturation of the core of the exit fibre (fiber 83 in FIG. 8), is the possibility of completing the saturation of the optical exit fiber by injecting a complementary luminous flux from a source of sufficient brightness, into the aperture constituted by the space and with the aid of light rays whose paths are identical to the paths followed by the rays which constitute the dispersion luminous flux, but which propagates in an opposite direction.

In order to realize the injection of such a complementary luminous flux, which carries information which is introduced at the directional coupler in the information routing circuit to which the fibers belong which terminate at the directional coupler, it suffices, for example in the arrangement of FIG. 9, to replace the detector 99 by a radiation source which is suitable for a coupler in which the information travels from the right to the left.

It is evident that the light rays emitted by a radiation source in directions of the line segments 107f and respectively 108f follow the paths of the light rays 107 and 108 in an opposite direction and penetrate the left-hand optical fiber (not shown) under conditions in which the rays 107 and 108 leave said fibers, i.e. with angles of incidence smaller than or at the most equal to the critical angle for total reflection.

Furthermore, apart of the light rays thus injected which obliquely penetrate the space 109 without passing through the sleeve 105 of the optical fiber 103, can penetrate the core of the left-hand fiber (not shown) either directly, or first penetrate the sleeve of said fiber, whose index of refraction is slightly smaller than that of the core.

This operation of injecting a complementary luminous flux in said exit fiber if the coupler moreover corresponds to that represented in FIG. 7 on which the light rays can be seen which are emitted by the light-emitting diode 75 and which are focussed on the optical fibers in the immediate vicinity of the space between these fibers.

In order to improve the efficiency of injection of a luminous flux both into the sleeve from the end of the entrance fiber in the coupler, and into the entrance face of the exit fiber of the coupler and the periphery of the sleeve of the exit fiber, it is advantageous and highly desirable to effect this injection with the aid of a simple optical arrangement having a suitably selected focal length, which ensures that the light rays are focussed at the desired points and at a maximum angle which is compatible, with the critical angle for total reflection of the light rays at the boundary surface of the core and the sleeve of the optical fibers. The simple converging optical system which is used may employ refraction means, such as a lens which is in the path of the light rays from the source to the space between the fibers, or reflection means such as a mirror having a profile approximating that of a parabola. The luminous flux can be brought into the injection zone either directly or after reflection at a concave mirror, or after reflection at a concave mirror and at a plane mirror which changes the direction of the beam.

In the case of a correct adaptation, the simple optical focussing system which is used is equivalent to a condenser which provides an image of the source at the location of the exit. fiber, Thus, a suitable optical conjugation is obtained of the source and the zone where the flux is introduced into the fiber, and the flux emitted by the source can be used more effectively.

What is claimed is:

1. A directional coupling device for multimode optical fibers, which comprises a coupler body of a material which is transparent in a given wavelength range of optical radiation and which is a carrier for the transmitted information, two axially aligned optical single multimode fibers having ends coupled to said body, at least one of which transfers information from one or more information sources which are disposed along an information routing circuit including said optical fibers, at least one of said fibers transferring the information conveyed by the other fiber, to which latter information specific information is added which is introduced in the directional coupling device, the coupled optical fibers being aligned in the body of the directional coupler with said ends of the two optical fibers being fixed opposite each other at an adjustable distance which corresponds to the desired degree of coupling between the two optical fibers, means for introducing light rays into the body of the directional coupler along an axis such that a portion of the light rays is intercept by and enters into at least one of the optical fibers, said latter means for introducing light rays including a radiation source arranged on at least one of the ends of the coupler body, and photo-sensitive means for picking up at least a fraction of the dispersion luminous flux extracted from the luminous flux which passes through at least one of the two fibers and through said coupler body, said photo-sensitive means comprising at least one photosensitive detector arranged on at least one of the ends of the body of the coupling device.

2. A device as claimed in claim 1 wherein the body of the directional coupling device is a thick-walled tube whose inner diameter is slightly greater than the diameter of the two optical fibers.

3. A device as claimed in claim 2, wherein the coupling device is a capillary tube having end faces substantially perpendicular to the axis of said tube, each end face carrying at least one radiation-sensitive element.

4. A device as claimed in claim 2 wherein at least one of the ends of the body of the coupling device is at least partially constituted by an oblique plane reflecting surface forming an angle of approx. 45° with the axis of the optical fibers, and at least one plane surface which is parallel to the axis of the optical fibers, and carries at least one radiation-sensitive element which is at least partially disposed in the wall of the body of the directional coupler, directly above the oblique plane reflecting surface.

5. A device as claimed in claim 1 wherein the ends of the optical fibers are immersed in a transparent body, which is at least temporarily fluid, whose index of refraction is at least equal to that of the outer zone of the optical fibers.

6. A device as claimed in claim 5, wherein the transparent body is a silicone oil, the optical fibers being immobilized by a drop of glue which is applied. At the points where the optical fibers are inserted in the coupler body.

7. A device as claimed in claim 5, wherein the transparent body is a synthetic resin.

8. A device as claimed in claim 7 wherein the radiation-sensitive elements are coupled to input and output zones of light rays, in and outside the body of the directional coupling device respectively, via an optical means for concentrating the luminous flux.

9. A device as claimed in claim 8, wherein the optical means for concentrating the luminous flux is constituted by a drop of a transparent synthetic resin, which is moulded onto the radiation-sensitive element and onto the coupler body, and which is externally coated with a reflecting metal film.

10. A fiber optic coupler for an optical transmission line comprising:

a first length of multi-mode optical fiber having a first end for serially connecting into the optical line and a second end, and a second length of multi-mode optical fiber having a first end for serially connecting into the optical line and a second end, the second end of the second fiber being moveably mounted with respect to the second end of the first fiber substantially along a common axis so as to face one another at a variable distance 1, where $1 \geq 0$, such that the portion of the optical energy leaving the second end of the first fiber which is launched into the second end of the second fiber is a function of the variable distance 1; and reflective surface means mounted about the second fiber and facing the second end of the first fiber for reflecting the remaining portion of the optical energy leaving the second end of the first fiber out of the coupler.

11. A fiber optic coupler as claimed in claim 10 which further includes a block of optically transparent material having a refractive index substantially similar to the first and second fiber cores, the second end of the first fiber being fixed within said block and the second end of said second fiber being mounted within an opening in said block so as to be moveable in the direction of the common axis, and the reflective surface means being an optically reflective coating on one surface of said block.

12. A fiber optic coupler as claimed in claim 11 wherein said reflective surface is planar and said coupler includes means for focussing the reflected optical energy.

13. A fiber optic coupler for an optical transmission line comprising:

a first length of multi-mode optical fiber having a first end for serially connecting into the optical line and a second end, and a second length of multi-mode optical fiber having a first end for serially connecting into the optical line and a second end;

A chamber containing a liquid having a refractive index substantially similar to the first and second fiber cores, the second end of the first fiber being fixed within said chamber and the second end of the second fiber being moveably mounted with respect to the second end of the said first fiber within said chamber substantially along a common axis so as to face one another at a variable distance 1, where $1 \geq 0$, such that a variable portion of the optical energy leaving the second end of the first fiber will be launched into the second end of the second fiber, said chamber having an optically transparent opening and an inner optically reflective surface facing the second end of the first fiber for reflecting the remaining portion of the optical energy leaving the second end of the first fiber, out of the coupler through the optically transparent opening in the chamber.

* * * * *